United States Patent
Schuster et al.

(10) Patent No.: US 9,732,616 B2
(45) Date of Patent: Aug. 15, 2017

(54) LUBRICATION OF VOLUMETRICALLY OPERATING EXPANSION MACHINES

(75) Inventors: Andreas Schuster, Tussenhausen (DE); Richard Aumann, München (DE); Andreas Sichert, München (DE)

(73) Assignee: ORCAN ENERGY AG, Munich (DE)

(*) Notice: Subject to any disclaimer, the term of this patent is extended or adjusted under 35 U.S.C. 154(b) by 466 days.

(21) Appl. No.: 13/979,088

(22) PCT Filed: Jan. 9, 2012

(86) PCT No.: PCT/EP2012/000063
§ 371 (c)(1),
(2), (4) Date: Oct. 25, 2013

(87) PCT Pub. No.: WO2012/097964
PCT Pub. Date: Jul. 26, 2012

(65) Prior Publication Data
US 2014/0050560 A1    Feb. 20, 2014

(30) Foreign Application Priority Data
Jan. 17, 2011  (EP) .................................... 11000329

(51) Int. Cl.
*F01C 21/04* (2006.01)
*F04C 29/02* (2006.01)
(Continued)

(52) U.S. Cl.
CPC .............. *F01C 21/04* (2013.01); *F01B 31/10* (2013.01); *F01C 21/045* (2013.01); *F01K 25/06* (2013.01);
(Continued)

(58) Field of Classification Search
CPC .......... F01K 23/10; F01K 23/04; F01K 25/06; F01K 25/10; F01K 13/00; B01D 17/04;
(Continued)

(56) References Cited

U.S. PATENT DOCUMENTS 3,796,053 A * 3/1974 Teagan .................. F22B 37/265
165/111
3,797,248 A * 3/1974 Witzel .................... F01D 19/00
60/646
(Continued)

FOREIGN PATENT DOCUMENTS

JP          5941609 A       3/1984
JP       2006283675 A      10/2006
(Continued)

*Primary Examiner* — Mark Laurenzi
*Assistant Examiner* — Xiaoting Hu
(74) *Attorney, Agent, or Firm* — Moore & Van Allen PLLC; Henry B. Ward, III

(57) ABSTRACT

The present invention provides a method for lubricating an expansion machine, which method comprises: supplying of an operating medium which contains a lubricant by a vaporizer; separating of at least part of the lubricant from the operating medium which contains a lubricant and is supplied by the vaporizer; and supplying of the operating medium, which is depleted by the separation of the at least one part of the lubricant from the lubricant, to the expansion machine. Furthermore, a device is provided having a vaporizer which is configured for vaporizing an operating medium which contains a lubricant and for supplying it to an expansion machine, and having a lubricant separating device which is configured for separating at least one part of the lubricant from the operating medium which contains the lubricant and is supplied by the vaporizer to the expansion machine.

14 Claims, 1 Drawing Sheet

(51) Int. Cl.

| | | |
|---|---|---|
| *F01B 31/10* | (2006.01) | |
| *F01K 25/06* | (2006.01) | |
| *F01M 5/00* | (2006.01) | |
| *F16N 39/02* | (2006.01) | |
| *F01K 25/10* | (2006.01) | |
| *F16N 31/00* | (2006.01) | |
| *F16N 39/06* | (2006.01) | |
| *F04D 29/06* | (2006.01) | |
| *F16N 7/30* | (2006.01) | |

(52) U.S. Cl.
 CPC ............ *F01K 25/10* (2013.01); *F01M 5/002* (2013.01); *F04C 29/021* (2013.01); *F04C 29/026* (2013.01); *F04C 29/028* (2013.01); *F04D 29/06* (2013.01); *F16N 31/00* (2013.01); *F16N 39/02* (2013.01); *F16N 39/06* (2013.01); *F16N 7/30* (2013.01)

(58) Field of Classification Search
 CPC . F16N 7/30; F16N 21/00; F16N 31/00; F16N 39/02; F16N 39/06; F04C 29/026; F04C 29/021; F04C 18/16; F01B 31/10; F01M 5/002; F01M 2005/004; F01C 1/16; F01C 21/001; F01C 21/04; F01C 21/045; F04B 39/02–39/0292; F04D 29/06
 USPC .......................................................... 92/154
 See application file for complete search history.

(56) References Cited

U.S. PATENT DOCUMENTS

| | | | | |
|---|---|---|---|---|
| 5,820,777 | A * | 10/1998 | Schnur | C10M 105/38 252/68 |
| 5,823,294 | A * | 10/1998 | Mizutani | F04B 27/109 184/6.17 |
| 2002/0046570 | A1* | 4/2002 | Itoh | B60H 1/00907 62/324.1 |
| 2007/0175212 | A1* | 8/2007 | Uno | F01C 13/04 60/519 |
| 2009/0246061 | A1* | 10/2009 | Iijima | F04C 29/026 418/97 |
| 2010/0034684 | A1* | 2/2010 | Ast | F01K 21/005 418/84 |
| 2011/0265476 | A1 | 11/2011 | Berger et al. | |
| 2012/0237382 | A1* | 9/2012 | Yoshimura | F01K 25/06 418/85 |
| 2015/0275699 | A1* | 10/2015 | Waibel | F01K 7/165 60/615 |

FOREIGN PATENT DOCUMENTS

| | | | |
|---|---|---|---|
| JP | 2008542629 A | 11/2008 | |
| JP | WO 2011074539 A1 * | 6/2011 | ............ F01K 25/06 |
| WO | 2006131759 A2 | 12/2006 | |
| WO | 2010017981 A2 | 2/2010 | |

* cited by examiner

LUBRICATION OF VOLUMETRICALLY OPERATING EXPANSION MACHINES

FIELD OF THE INVENTION

The present invention relates to volumetrically operating expansion machines and in particular to a method for lubricating the latter

BACKGROUND OF THE INVENTION

The operation of expansion machines, such as steam turbines, is known in prior art, for example with the aid of the Organic Rankine Cycle (ORC) method for generating electric energy by employing organic media, for example organic media having low vaporization temperatures, which generally have higher vaporization pressures at the same temperatures compared to water as the operating medium. ORC plants constitute the realization of the Clausius Rankine cycle where electric energy is, for example, in principle obtained by adiabatic and isobaric changes of the state of an operating medium. By means of the vaporization, expansion and subsequent condensation of the operating medium, mechanical energy is obtained here and converted into electric energy. In principle, the operating medium is brought to the operating pressure by a feed pump, and energy in the form of heat provided by combustion or by a flow of waste heat is supplied to it in a vaporizer. The operating medium flows from the vaporizer via a pressure pipe to an expansion machine where it is expanded to a lower pressure. Subsequently, the expanded operating medium steam flows through a condenser where heat exchange takes place between the vaporous operating medium and a cooling medium, whereupon the condensed-out operating medium is returned to the vaporizer by a feed pump in a cyclic process.

A particular class of expansion machines is constituted by volumetrically operating expansion machines which are also referred to as displacement expansion machines and comprise a working chamber and perform work during a volume increase of this working chamber during the expansion of the operating medium. These expansion machines are realized, for example, in the form of piston expansion machines, screw expansion machines, or scroll expanders. Such volumetrically operating expansion machines are in particular employed in ORC plants of small power classes (e. g. with an electrical power of 1 to 500 kW). In contrast to turbines, volumetrically operating expansion machines, however, require lubrication by a lubricant in particular of the piston or of the profiles of the expansion room that roll on each other and of the rolling bearings and the sliding walls of the working chamber. The use of a lubricant advantageously also leads to a sealing of the working area of the expansion machine, whereby less steam is lost due to an overflow within the expansion machine, thus increasing efficiency.

FIG. 1 represents a schematic diagram of a lubrication system of prior art. An operating medium is supplied from a vaporizer 1 to an expansion machine 2. In the expansion machine 2, the vaporous operating medium is expanded, and via a generator 3, the released energy is converted into electric energy. Via a rotary oil pump 4, a lubricant, for example lubricating oil, is supplied to the expansion machine 2. The lubricant exits from the expansion machine 2 together with the expanded operating medium. The lubricant is present in the expanded operating medium in the form of a finely distributed oil mist and is separated from the operating medium in an oil separator 5, so that the operating medium is supplied from the oil separator 5 to a condenser 6 essentially free from oil. The condensed operating medium is supplied again to the vaporizer 1 by a feed pump 7. The recovered oil is supplied again to the expansion machine 2 via the rotary oil pump 4.

The lubrication system of prior art, however, involves the following disadvantages. Since the lubricant (lubricating oil) is separated on the low-pressure side after having passed the expansion machine 2, it is necessary to provide the rotary oil pump 4 which, since the lubricant must be supplied to the expansion machine 2 on the high-pressure side, must overcome the same pressure differential as the feed pump 7 transporting the operating medium, thereby requiring a lot of equipment and causing corresponding high costs. Moreover, a relatively large oil separator 5 is needed as the waste steam exiting from the expansion machine 2 has a lower density compared to the live steam supplied to the expansion machine 2, for example a density that is lower by more than one dimension. Furthermore, the separation of the lubricant from the waste steam of the operating medium is accomplished by means of cyclone separators or deflectors, always involving significant changes of direction of the flow of waste steam containing the lubricant, whereby pressure losses occur in combination with the relatively large volumes of the flow of waste steam, leading to a counter pressure acting on the expansion machine 2 and thus to a decrease in the efficiency of the latter.

Moreover, due to the relatively large mass or the relatively large volume of the waste steam, the relatively large oil separator 5 has a certain inertia having disadvantageous effects when the plant is being started or during changes of loads. Moreover, the lubricant injected by nozzles into the live steam inter alia in a liquid state approx, at the temperature of the waste steam undesirably reduces the live steam temperature and live steam enthalpy.

Thus, there is a demand for this, and it is thus the object of the present invention to provide a method for lubricating volumetrically operating expansion machines in which the above mentioned problems are eliminated or at least attenuated.

BRIEF SUMMARY OF THE INVENTION

The above mentioned object is achieved by the method for lubricating an expansion machine, comprising the following steps. An operating medium which contains a lubricant is supplied by a heat exchanger (vaporizer). The operating medium is partially or completely present in a vaporous state. At least a part of the lubricant is separated off from the operating medium which contains a lubricant and is supplied by the vaporizer. The operating medium which is depleted by the separation of the at least one part of the lubricant from the lubricant is supplied to the expansion machine.

In contrast to prior art, according to the invention, at least a part of the lubricant is separated from the operating medium supplied by the vaporizer. In prior art, however, this separation is effected from the operating medium exiting from the expansion machine. The provision of a rotary oil pump can be eliminated in the method according to the invention. Moreover, a lubricant separating device used for separating at least a part of the lubricant of the operating medium supplied by the vaporizer can be made to be smaller compared to prior art because the lubricant is separated off from the live steam instead of from the waste steam.

Moreover, the live steam temperature/enthalpy is, according to the invention, not undesirably reduced by adding a relatively cold lubricant.

According to a further embodiment, the method according to the invention comprises supplying at least a part of the separated lubricant to the expansion machine. While a portion of the lubricant remaining in the operating medium supplied to the expansion machine is used for lubricating parts of the working chamber of the volumetrically operating expansion machine that roll or slide on each other, according to this further embodiment, at least a part of the separated lubricant is supplied to lubrication points of the expansion machine.

The method according to the invention can advantageously be employed for lubricating a volumetrically working expansion machine of an Organic Rankine Cycle (ORC) plant. Thus, the operating medium can be provided in the form of an organic operating medium. Fluorinated hydrocarbons can be used, for example, as the operating medium. While the operating medium is typically supplied from the vaporizer to the expansion machine in a vaporous state, according to a further embodiment, the lubricant is present in the operating medium which contains a lubricant and is supplied by the vaporizer in a liquid state in the form of oil droplets which are entrained with the steam of the operating medium. The oil droplets are then at least partially separated from the operating medium by a lubricant separating device and collected before said operating medium enters the expansion machine, so that it can be supplied to lubrication points of the expansion machine. The lubricant in the form of oil droplets can be, for example, synthetic ester (also see detailed description below).

Since the lubricant passes the vaporizer together with the operating medium, it has, after having been separated from the essentially vaporous operating medium, a high temperature, so that it is under a relatively high pressure when it accumulates in the lubricant separating device. This high pressure leads to it being able to flow freely, and in particular without having to be pumped by a separate pumping device, to lubrication points of the expansion machine, for example to bearings that have to be lubricated.

On the other hand, and as was already mentioned, the lubricant supplied from the lubricant separating device to the lubrication points of the expansion machine is relatively hot. However, since it can advantageously also be utilized for removing heat from the lubrication points of the expansion machine, the method according to the invention comprises, according to an example, cooling down the separated lubricant before it is supplied to the lubrication points of the expansion machine.

Here, the heat of the lubricant (for example a lubricating oil) can be directly transferred to a cooling medium (e. g. air). The heat can be supplied directly from the pipe in which the lubricant is supplied to the lubrication points of the expansion machine to ambient air, or heat transfer is improved, e. g. by supplying the pipe with ribs. In this case, the heat is no longer available for the process.

Another option is the use of the cold operating medium for cooling. Here, the lubricant and the operating medium might flow through a heat exchanger. The heat then passes over from the lubricant to the cold operating medium before the latter is supplied to the vaporizer and is thus available again for the process.

So, the cooling of the separated lubricant supplied to the lubrication points of the expansion machine can at least partially be accomplished by means of the operating medium which contains the lubricant and is supplied to the vaporizer. The operating medium is present in a liquid state upstream of the vaporizer and comprises the lubricant dissolved therein. In this form, it is relatively cool compared to the state downstream of the vaporizer. Thus, it can be guided, for example, at least partially through cooling ribs provided around a pipe in which the separated lubricant flows to the lubrication points of the expansion machine, and it can thus cool the lubricant on its transport path to the expansion machine.

The above mentioned object is also achieved by providing a device which comprises a vaporizer which is configured for vaporizing en operating medium which contains a lubricant and for supplying it to an expansion machine; and a lubricant separating device which is configured for separating at least a part of the lubricant from the operating medium which contains the lubricant and is supplied by the vaporizer to the expansion machine.

The lubricant separating device can be furthermore configured for supplying at least a part of the separated lubricant of the expansion machine to corresponding lubrication points, such as bearings of the expansion machine to be lubricated.

According to a further embodiment, the device according to the invention is an Organic Rankine Cycle device in which an organic operating medium is employed.

The expansion machine can be selected from the group consisting of a piston expansion machine, a screw expansion machine, a scroll expander, a vane machine and a roots expander.

The device according to the invention can furthermore comprise a pipeline in which the lubricant separated in the lubricant separating device is guided to lubrication points of the expansion machine and cooling ribs that surround the pipeline.

Furthermore, a steam power plant, for example a geothermal steam power plant or a biomass combustion steam power plant, comprising the device according to one of the above examples is provided.

BRIEF DESCRIPTION OF THE DRAWINGS

Further features and exemplary embodiments as well as advantages of the present invention will be illustrated more in detail hereinafter with reference to the drawings. It will be understood that the embodiments do not exhaust the field of the present invention. It will be furthermore understood that some or all features described below can also be combined with each other in a different way.

DETAILED DESCRIPTION OF THE INVENTION

Figure 2:
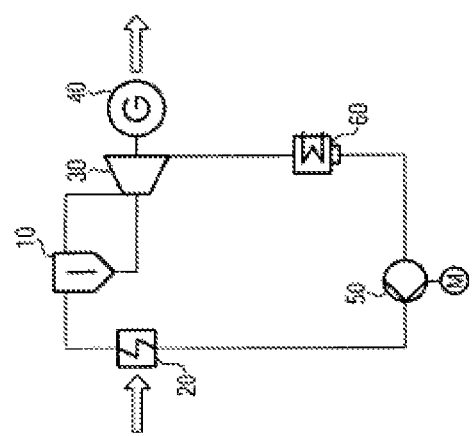
FIG. 2 illustrates, by way of example, a lubrication system for a volumetric expansion machine according to the present invention.
Figure 1:
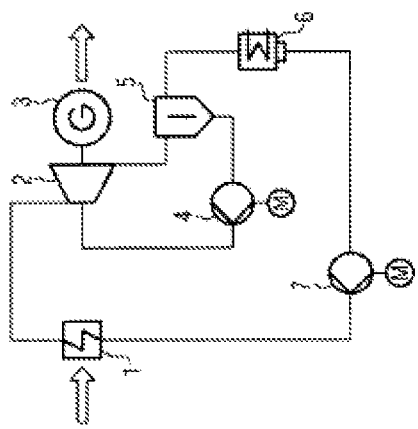
FIG. 1 represents a lubrication system for a volumetric expansion machine according to prior art.

As is shown in FIG. 2, a lubrication system for a volumetric expansion machine comprises, according to an example of the present invention, a lubricant separating device (below, an oil separator by way of example) 10 which is inserted between a vaporizer 20, which supplies a completely or partially vaporized operating medium, and an expansion machine 30, which is used for obtaining electric energy in cooperation with a generator 40. While in prior art, as is described above with reference to FIG. 1, a separation of the lubricant from the flow of waste steam is effected, according to the invention, at least a part of the lubricant is separated from the live steam of the operating medium which is mixed with the lubricant and supplied to the expansion machine 30. In the oil separator 10, corresponding separation plates can be provided such that in the operating medium reaching the expansion machine 30, still a sufficient amount of lubricant (lubricating oil) is present, so that a reliable lubrication of parts of the working chamber of the volumetrically operating expansion machine 30 that roll or slide on each other can be obtained. As an alternative, the separation of the lubricant in the oil separator 10 could be effected essentially completely, and a suited amount of lubricant could be supplied again to the live steam of the operating medium before the latter enters the expansion machine 30.

The separated lubricating oil is collected in the oil separator 10. Since it has been brought to a high temperature after it has passed the vaporizer together with the operating medium, it is under high pressure in the oil separator 10, so that it can freely flow via a corresponding pipe to the expansion machine 30 to lubricate corresponding lubrication points of the latter there. Besides lubricating bearings, it can also remove lost heat from the bearings. To this end, it can be advantageous to cool down the lubricating oil before or during transport to the lubrication points of the expansion machine 30. This cooling can be done, for example, with the aid of cooling ribs which are provided around the pipeline to the lubrication points of the expansion machine 30. Cooling can also be done by a heat coupling to the operating medium returned by the feed pump 50 which, after expansion in the expansion machine 30, passes a condenser 60 for condensation. The heat can alternatively pass over directly from the pipeline, in which the lubricant is supplied to the lubrication points of the expansion machine, to ambient air. According to a further alternative, the lubricant and the operating medium may flow through a heat exchanger. The heat then passes over from the lubricant to the cold operating medium.

By way of example, the lubricant is present in the operating medium in a dissolved form when it is being supplied to the vaporizer 20 through the feed pump 50. This can be achieved by a suited selection of the operating medium and the lubricant. For example, the operating medium can be provided in the form of a fluorinated hydrocarbon, e. g. R134a, R245fa, and the lubricant in the form of a synthetic ester, e. g. an oil of the series Reniso Triton SE/SEZ of the supplier Fuchs, where it should be taken care that no miscibility gap with a corresponding phase separation of the operating medium and the lubricant occurs in the operational temperature range. The lubricating oil will i. a. have a temperature of ebullition that is clearly higher than that of the operating medium, so that it is present in a liquid state in the form of drops in the operating steam of the operating medium after having passed the vaporizer 20.

Since according to the described example, the lubricating oil separated in the oil separator 10 is under high pressure, so that, caused by the pressure, it can freely flow to the expansion machine 30, there is no need to provide a further pump device for the lubricant. Moreover, compared to prior art, a lower volume per time flows through the oil separator 10, so that the latter can have a comparatively compact design, resulting in savings of space and costs. Furthermore, the pressure loss downstream of the expansion machine 30 is reduced, and thus, the pressure drop via the expansion machine 30 can be increased compared to the conventional configuration with an oil separator 10 disposed downstream of the expansion machine 30, so that the efficiency of the expansion machine 30 can be increased. Moreover, lubricant remains directly in the live steam of the operating medium or it is supplied to the latter at live steam temperature, so that in contrast to prior art, the use of a lubricant does not lead to a reduction in the live steam temperature and enthalpy.

Furthermore, the inventive lubrication of a volumetrically operating expansion machine significantly improves the start-up behavior of an ORC plant. When the ORC plant is being started, a cold operating medium is supplied to the vaporizer 20 by building up thermal pressure by evaporation. The steam is supplied to the condenser 60 in the course of the start-up operation via a bypass line (not shown in FIG. 2). Equally, a liquid lubricant, for example lubricating oil from the oil separator 10, is supplied to the condenser. The liquefied operating medium and the lubricating oil flow into a feed container from where they are supplied to the vaporizer 20 through the feed pump 50. The lubricating oil can also be supplied directly into the feed container for dissolution in the operating medium. Thus, in a time-saving manner, the complete provided lubricant supply can be guided through the vaporizer and brought to operating temperature.

The invention claimed is:

1. Method for lubricating an expansion machine, comprising
supplying of a vaporized operating medium which contains a lubricant by a vaporizer, the lubricant being present in the operating medium supplied by the vaporizer in the form of oil droplets;
separating of only a part of the lubricant from the vaporized operating medium which is supplied by the vaporizer; and
supplying of the operating medium which is depleted in the lubricant by the separation of the part of the lubricant from the operating medium to the expansion machine such that the lubricant remaining in the depleted operating medium lubricates parts of the working chamber of the expansion machine that roll or slide on each other.

2. Method according to claim 1, furthermore comprising supplying of at least a part of the separated lubricant to the expansion machine.

3. Method according to claim 1, wherein the operating medium is provided in the form of an organic operating medium.

4. Method according to claim 1, wherein the separated lubricant is collected in a part of a lubrication device under pressure, and then flows, due to said pressure from this part to lubrication points of the expansion machine.

5. Method according to claim 4, furthermore comprising cooling down the separated lubricant before it is supplied to the lubrication points of the expansion machine.

6. Method according to claim 5, wherein the cooling down of the separated lubricant supplied to the lubrication points of the expansion machine is effected with the aid of the operating medium which contains the lubricant and which is supplied to the vaporizer.

7. Method according to claim 1, wherein the operating medium comprises a fluorinated hydrocarbon, and the lubricant comprises a synthetic ester.

8. Device having
a vaporizer which is configured to vaporize an operating medium which contains a lubricant and to supply the vaporized operating medium to an expansion machine, the lubricant in the vaporized operating medium supplied by the vaporizer being present in the form of oil droplets; and a lubricant separating device which is configured to separate only a part of the lubricant from the operating medium which contains the lubricant and is supplied by the vaporizer to the expansion machine such that in the operating medium after separation of the part of the lubricant an amount of lubricant remains present to allow lubrication of parts of the working chamber of the expansion machine that roll or slide on each other.

9. Device according to claim 8, wherein the lubricant separating device is furthermore configured for supplying at least a part of the separated lubricant to the expansion machine.

10. Device according to claim 8, wherein the device is an Organic Rankine Cycle device.

11. Device according to claim 8, wherein the expansion machine is selected from the group consisting of a screw expansion machine, a scroll expander, a vane machine, and a roots expander.

12. Device according to claim 8, furthermore comprising
a pipeline, wherein the lubricant separated in the lubricant separating device is guided to lubrication points of the expansion machine; and
cooling ribs surrounding the pipeline.

13. Device according to claim 8, furthermore comprising a heat exchanger which is provided such that the lubricant and the operating medium are guided through it, so that heat from the lubricant is transferred to the operating medium before the operating medium is supplied to the vaporizer.

14. Steam power station, comprising:
an expansion machine; and
the device according to claim 8.

* * * * *